United States Patent
White (10) Patent No.: US 8,091,866 B2
(45) Date of Patent: Jan. 10, 2012

(54) WIRE PULL ASSEMBLY

(76) Inventor: Christopher L White, Morrison, CO (US)

( * ) Notice: Subject to any disclaimer, the term of this patent is extended or adjusted under 35 U.S.C. 154(b) by 422 days.

(21) Appl. No.: 12/420,957

(22) Filed: Apr. 9, 2009

(65) Prior Publication Data

US 2010/0258771 A1    Oct. 14, 2010

(51) Int. Cl.
*H02G 1/08* (2006.01)
*F16L 3/00* (2006.01)

(52) U.S. Cl. .............................. 254/134.3 FT; 294/86.42

(58) Field of Classification Search ................... 254/134, 254/134.3 FT; 24/115 N, 122.3; 294/86.32, 294/86.42
See application file for complete search history.

(56) References Cited

U.S. PATENT DOCUMENTS

| | | | |
|---|---|---|---|
| 1,386,161 A | 8/1921 | William | |
| 1,807,993 A * | 6/1931 | Martin | 294/86.42 |
| 2,112,281 A * | 3/1938 | Ferris | 403/373 |
| 2,357,773 A | 9/1944 | Sheskier | |
| 2,472,392 A | 6/1949 | Alexander | |
| 2,487,203 A | 11/1949 | Wilber | |
| 2,496,412 A | 2/1950 | Scheppe | |
| 2,567,994 A | 9/1951 | Downs | |
| 2,747,384 A | 5/1956 | Beam | |
| 2,926,020 A | 2/1960 | Dayton et al. | |
| 2,958,349 A | 11/1960 | McNutt | |
| 3,006,223 A | 10/1961 | Broussard | |
| 3,016,073 A | 1/1962 | Broussard et al. | |
| 3,137,765 A * | 6/1964 | Lanum | 174/90 |
| 3,251,605 A | 5/1966 | Ondeck | |
| 3,735,993 A | 5/1973 | Seibert | |
| 4,368,910 A * | 1/1983 | Fidrych | 294/86.42 |
| 4,453,291 A * | 6/1984 | Fidrych | 294/86.42 |
| 4,601,507 A * | 7/1986 | Fallon | 294/86.42 |
| 4,692,073 A | 9/1987 | Martindell | |
| 4,900,202 A | 2/1990 | Wienhold | |
| 4,969,677 A * | 11/1990 | Melegari | 294/86.42 |
| 4,990,038 A | 2/1991 | DeLong | |
| 5,015,805 A * | 5/1991 | Beckloff et al. | 174/75 C |
| 5,133,583 A * | 7/1992 | Wagman et al. | 294/86.42 |
| 5,167,476 A | 12/1992 | Lafferty et al. | |
| 5,398,946 A | 3/1995 | Quiring | |
| 5,480,203 A * | 1/1996 | Favalora et al. | 294/86.42 |
| 5,957,634 A | 9/1999 | Carpinetti | |
| 6,199,872 B1 | 3/2001 | Hasan | |
| 6,254,026 B1 * | 7/2001 | Tsai | 242/390.2 |
| 6,270,087 B1 | 8/2001 | Mickel et al. | |

(Continued)

FOREIGN PATENT DOCUMENTS

JP    8090313    4/1996

(Continued)

OTHER PUBLICATIONS

Greenlee Tool Catalog, date unknown, D'VersiBIT® System and Accessories, pp. 88-90.* Greenlee, D'versibits & Accessories, [catalog], pp. 45-47, Date Unknown.

*Primary Examiner* — David B Thomas (74) *Attorney, Agent, or Firm* — Trego, Hines & Ladenheim, PLLC (57) ABSTRACT

A wire pull assembly including a quick-change assembly and a wire pull attachment. The wire pull attachment includes an insert, a basket adapted to receive and secure an article therein, and a swivel assembly interconnecting the insert and basket such that the swivel assembly allows the basket to move freely relative to the insert.

21 Claims, 7 Drawing Sheets

U.S. PATENT DOCUMENTS

| | | |
|---|---|---|
| 6,311,989 B1 | 11/2001 | Rosanwo |
| 6,511,266 B1 | 1/2003 | Groot |
| 6,511,268 B1 | 1/2003 | Vasudeva et al. |
| 6,883,782 B2 * | 4/2005 | Ames et al. .......... 254/134.3 FT |
| 7,246,789 B2 * | 7/2007 | Ames et al. ................... 254/134 |
| 2001/0042964 A1 | 11/2001 | Bedi et al. |
| 2007/0206996 A1 | 9/2007 | Bharadwaj et al. |
| 2007/0264093 A1 | 11/2007 | White et al. |

FOREIGN PATENT DOCUMENTS

| | | |
|---|---|---|
| JP | 08163744 | 6/1996 |
| JP | 2007206150 | 8/2007 |
| KR | 100602743 | 7/2006 |
| KR | 100622458 | 9/2006 |

* cited by examiner

WIRE PULL ASSEMBLY

BACKGROUND OF THE INVENTION

The present invention relates to the field of wire pullers. More particularly, the invention relates to a quick-change wire pull attachment and assembly.

Wire pullers are used in commercial and residential construction to retrieve and pull wire and cable through holes or channels created during the construction of buildings. These pullers allow the user to run extended wiring and cabling throughout the building.

Most tools today are dedicated to a specific task and do not have the ability to be changed or secured to a variety of extension tools. This is particularly true of today's wire pullers. Current wire pullers use a small spring clip that is threaded through a small opening in the end of a drill bit. The spring clip is then manually closed to secure the wire puller to the bit.

The clips used to attach the wire puller to the bit are small, difficult to use, and require both hands. Many of the clips simply do not fit through the hole in the end of the drill bit, making it completely non-functional. Further, when using a drill bit to pull wire back through a hole that was just drilled with the drill bit, the hole is the exact size of the drill bit which results in a very "tight fit". This makes it difficult to pull the wire puller and wire back through the hole.

Accordingly, there is a need for a quick-change wire pull attachment and assembly that allows a user to quickly and efficiently pull a wire through a hole or channel in the construction of a building.

BRIEF SUMMARY OF THE INVENTION

These and other objects of the present invention are achieved in the preferred embodiments disclosed below by providing a wire pull attachment. The wire pull attachment includes an insert having first and second shank ends and a basket adapted to receive and secure an article therein.

According to another preferred embodiment of the invention, a wire pull assembly includes a quick-change assembly and a wire pull attachment. The wire pull attachment includes an insert and a basket adapted to receive and secure an article therein.

According to another preferred embodiment of the invention, a method of retrieving and pulling an article through a hole or channel includes the steps of providing a wire pull attachment having an insert and a basket. The method further including the steps of securing the wire pull attachment in a quick-release head, inserting the wire pull attachment into the hole or channel, positioning the article in the basket, and pulling the wire pull attachment and article out of the hole or channel.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
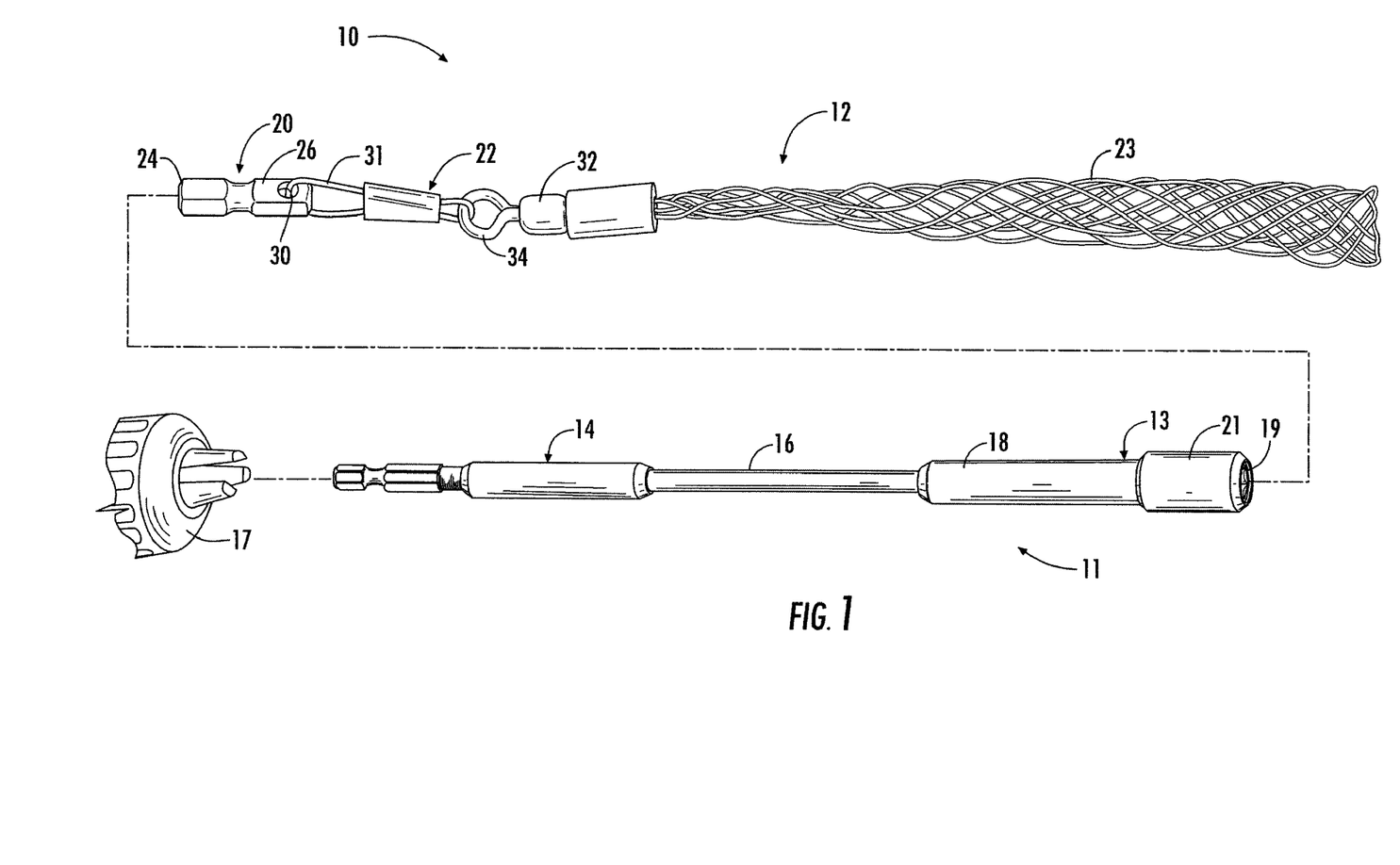
FIG. 1 shows a wire pull assembly according to an embodiment of the invention.

Referring now specifically to the drawings, a wire pull assembly according to an embodiment of the invention is illustrated in FIG. 1 and shown generally at reference numeral 10. The wire pull assembly 10 includes a quick-change assembly 11 and a wire pull attachment 12.

The quick change assembly 11 includes a quick-release head 13, a tailpiece 14 for being secured in a chuck 17 of a drill, and a shaft or rod 16 interconnecting the head 13 and the tailpiece 14 and providing an extension. It should be appreciated that the rod 16 may be a flexible, solid core rod or any other suitable type of extension. It should also be appreciated that the tailpiece could be integrated into the head, thereby eliminating the need for a separate tailpiece and rod.

The head 13 includes a body 18 having a bore 19 for receiving a quick-change insert 20 of the wire pull attachment 12. A spring-biased sleeve 21 is positioned around the body 18 and moves from a secured position, FIG. 1, to a release/receiving position, FIG. 3, to allow the wire pull attachment 12 to be releasably secured to the quick-change assembly 11. As shown, the bore 19 has a hexagonal profile for receiving a hexagonal insert, such as insert 20; however, any suitable profile may be used to receive inserts of various profiles.

Figure 2:
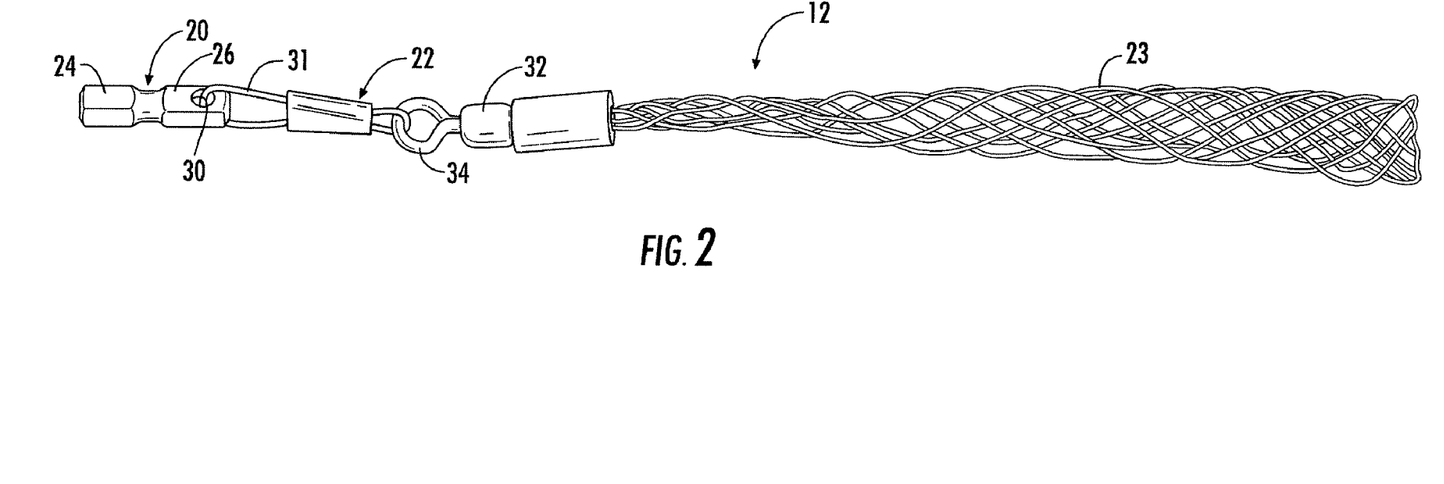
FIG. 2 shows a wire pull attachment of the wire pull assembly of FIG. 1.

As shown in FIG. 2, the wire pull attachment 12 includes the quick-change insert 20, a swivel assembly 22, and a basket 23 for receiving and pulling a cable or wire. The insert 20 is designed to be inserted into and secured in a quick-release head, such as head 13. The insert 20 includes a first shank end 24 and a second shank end 26. The first shank end 24 has a hexagonal profile for mating with the bore 19 and prevent slipping within the bore 19.

Figure 3:
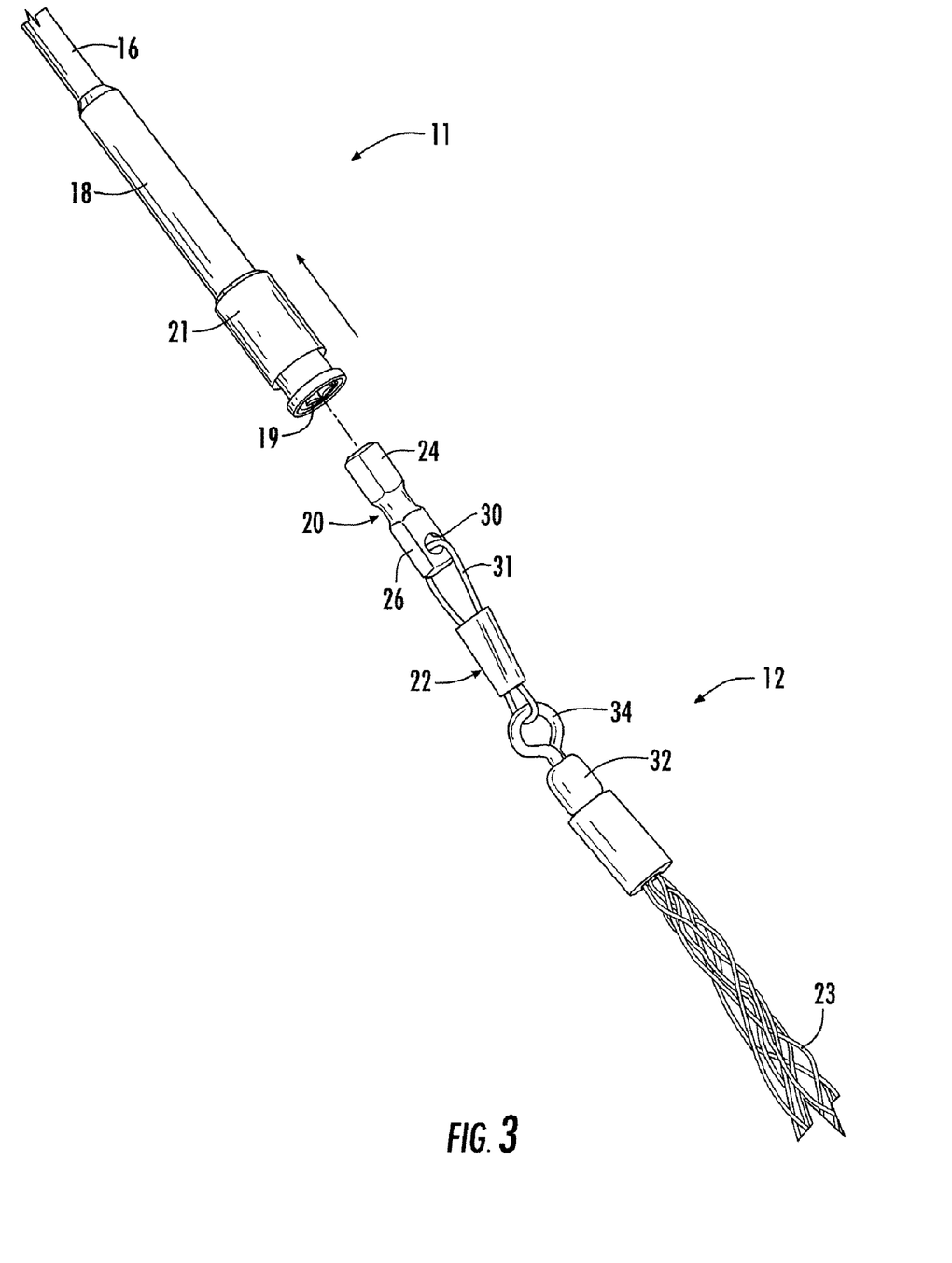
FIG. 3 shows the wire pull attachment of FIG. 2 being inserted into a quick-release head of the wire pull assembly.

As illustrated in FIG. 3, the end 24 is inserted into the bore 19 of the head 13 by sliding the sleeve 21 from the secured position to the receiving position, thereby allowing the end 24 of the insert 20 to be received in the bore 19. Releasing the sleeve 21 allows the sleeve 21 to move from the receiving position to the secured position, thereby securing the insert 20 in the bore 19. It should be appreciated that the end 24 may also be directly secured in the chuck 17.

Referring again to FIG. 2, the end 26 includes an aperture 30 to allow the swivel assembly 22 to be connected to the insert 20. The swivel assembly 22 includes a clasp 31 and a rotating assembly 32. The clasp 31 extends between the insert 20 and the rotating assembly 32 and interconnects the insert 20 and rotating assembly 32 by extending through the aperture 30 and a hook or ring 34 of the rotating assembly 32. Additionally, the clasp 31 allows the swivel assembly 22 to be easily disconnected from the insert 20 so that additional inserts may be used or so that additional attachments, such as sockets may be attached to the end 26.

The basket 23 is connected to the swivel assembly 22 to allow the basket 23 to move freely relative to the quick-change assembly 11. As illustrated, the basket 23 has a mesh-like structure to allow the basket 23 to receive and secure a cable or wire therein. It should be appreciated that the basket structure may be any suitable structure for receiving and securing a cable, wire, or article of manufacture therein.

Figure 4:
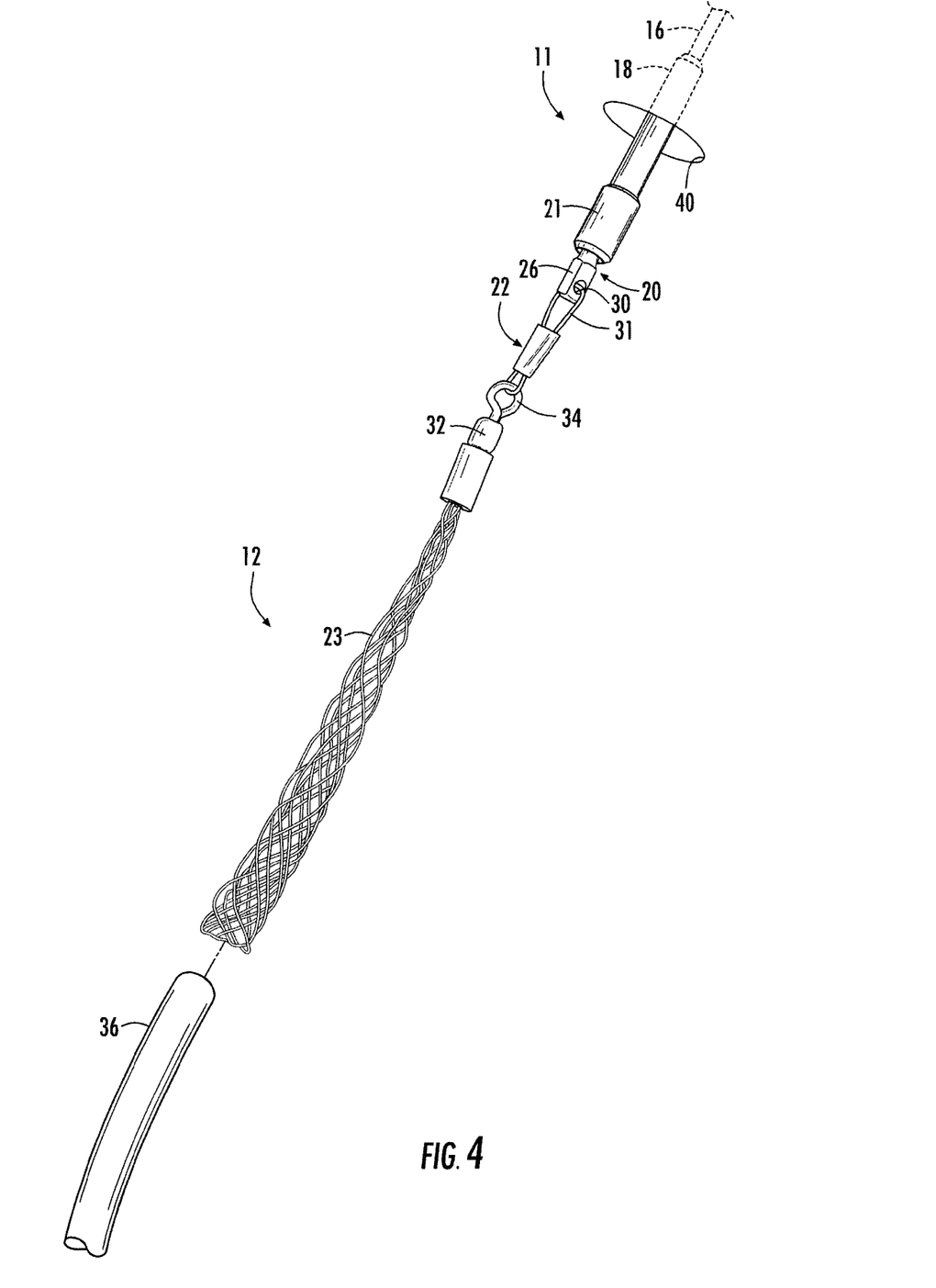
FIG. 4 shows a wire being inserted into the wire pull attachment of FIG. 2.

Referring to FIG. 4, in use, after a user has drilled a channel or hole 40 using the quick-change assembly 11, the user removes a drill bit (not shown) from the bore 19 of the assembly 11 and replaces the bit with the attachment 12. Once the attachment 12 has been secured to the quick-change assembly 11, the attachment 12 is extended through the hole 40 until the basket 23 is in position to receive a cable or wire 36.

Figure 5:
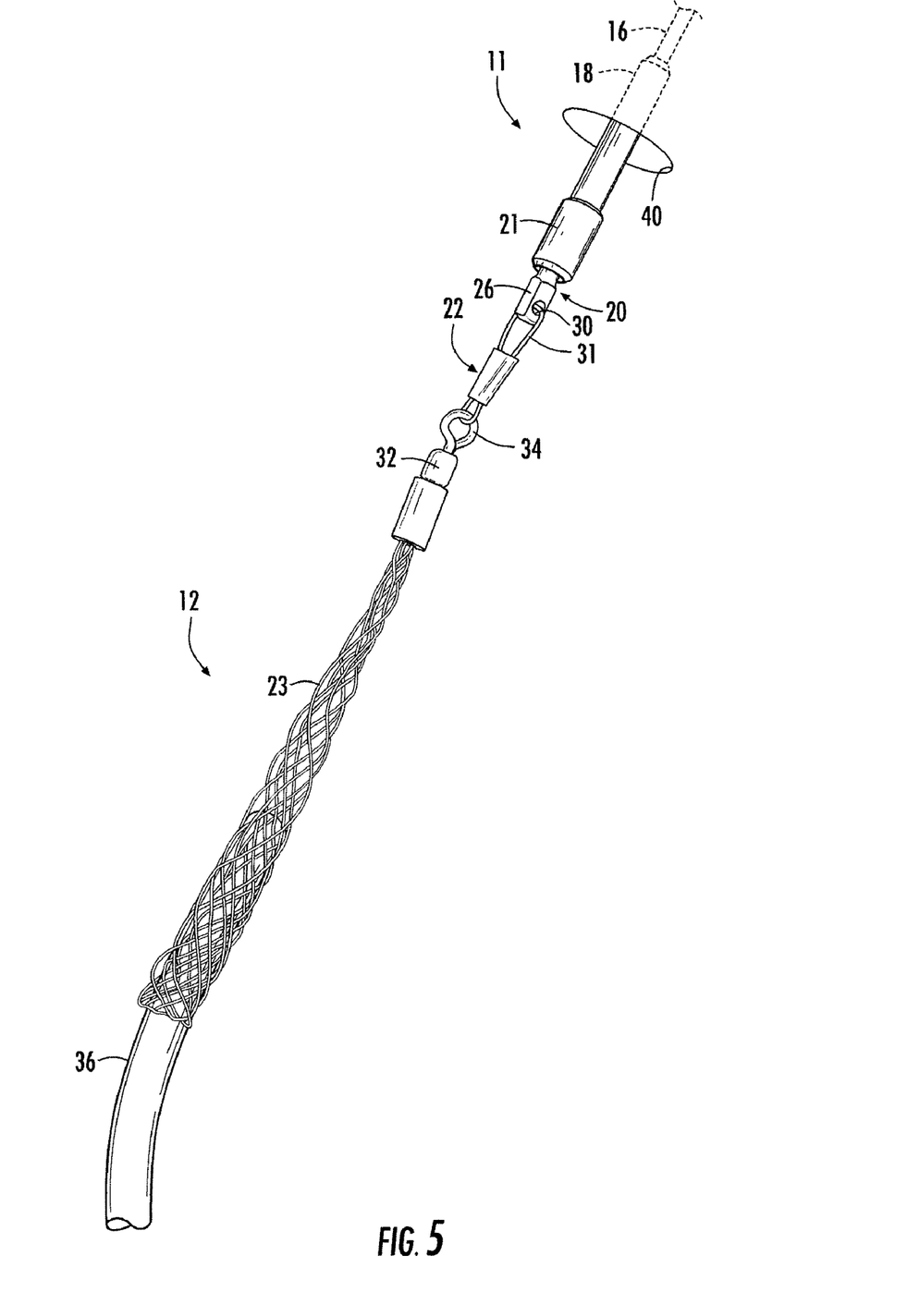
FIG. 5 shows the wire of FIG. 4 secured in the wire pull attachment.

As shown in FIG. 5, the cable or wire 36 is then inserted into the basket 23 so that the cable or wire 36 may be pulled up through the hole 40. As the cable or wire 36 is pulled, the basket 23 stretches and cinches around the cable or wire 36 to prevent the cable or wire from slipping or falling out of the basket 23. It should be appreciated that wire pull attachment 12 is not limited to just cables and wire, and may be used to receive and secure other articles therein so that the article may be pulled through a channel or hole.

Figure 6:
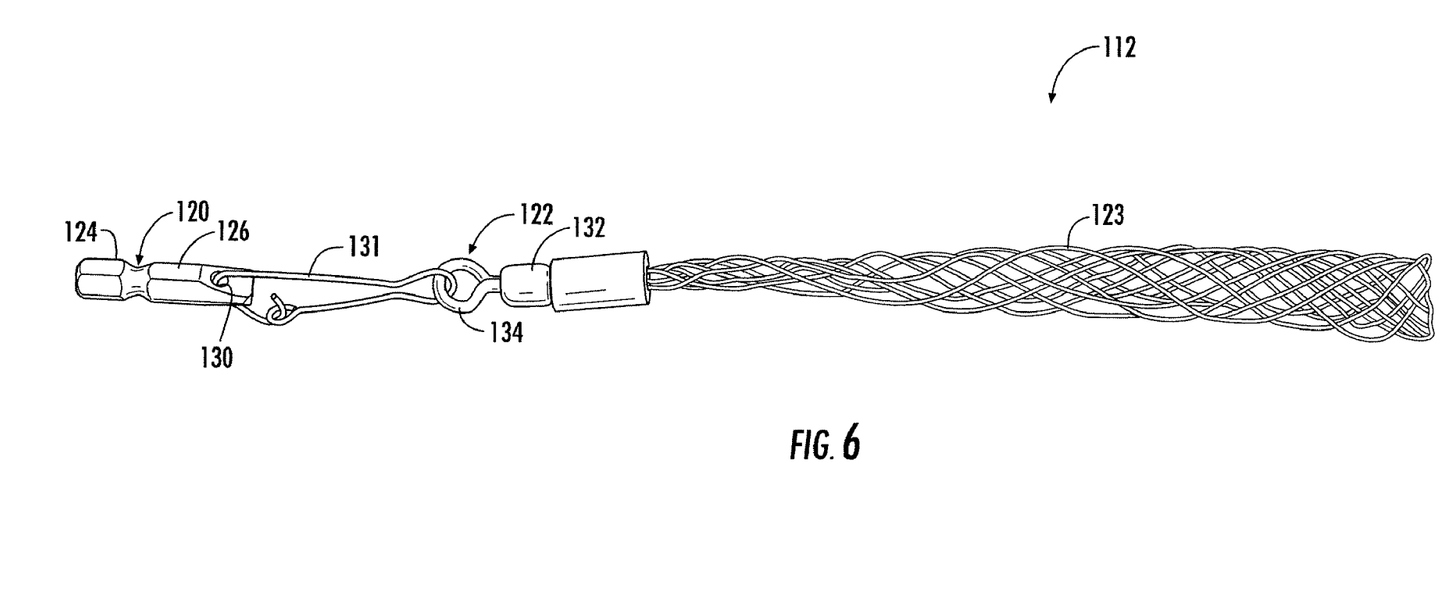
FIG. 6 shows a wire pull attachment according to an embodiment of the invention.

Referring to FIG. 6, a wire pull attachment according to an embodiment is shown at reference numeral 112. Like wire pull attachment 12, wire pull attachment 112 includes an insert 120, a swivel assembly 22 having a clasp 131 and a rotating assembly 132, and a basket 123. Unlike attachment 12, the insert 120 includes a wedge-shaped end 126 having an aperture 130 for receiving clasp 131. The end 126 increases the range of motion of the swivel assembly 122 relative to the quick-change assembly 11. Further, the shape of the end 126 allows the insert 120 to be used as a flat-head screwdriver by folding the swivel assembly 122 and basket 123 back or by simply removing the swivel assembly 122 and basket 123 from the insert 120.

Figure 7:
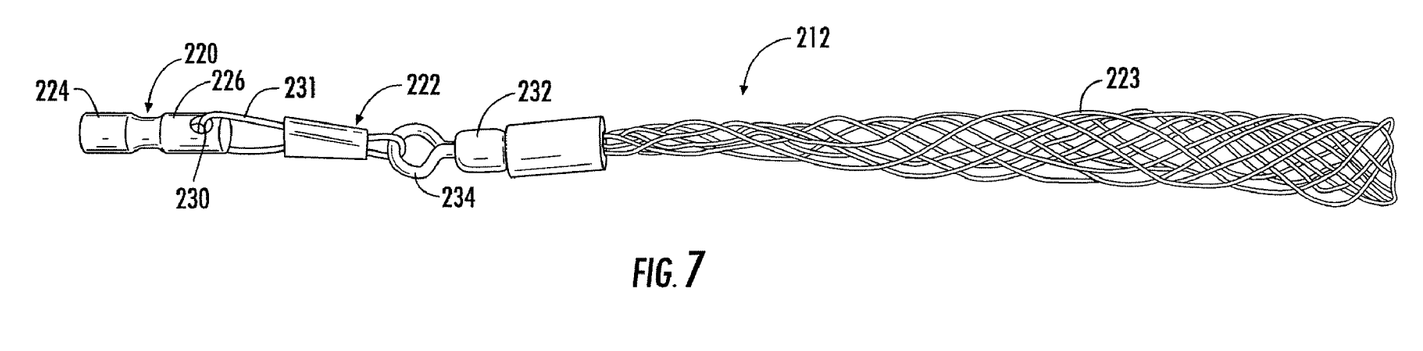
FIG. 7 shows a wire pull attachment according to an embodiment of the invention.

As illustrated in FIG. 7, a wire pull attachment 212 includes a cylindrically-shaped insert 220 instead of the hexagonally-shaped inserts 20 and 120. It should be appreciated that inserts having other shapes or profiles may also be used.

A wire pull assembly is described above. Various details of the invention may be changed without departing from its scope. Furthermore, the foregoing description of the preferred embodiments of the invention and best mode for practicing the invention are provided for the purpose of illustration only and not for the purpose of limitation.

What is claimed is:

1. A wire pull attachment, comprising:
   (a) an insert having first and second shank ends, the first shank end having a profile adapted for mating engagement with a bore of a quick-release head; and
   (b) a basket operably connected to the insert and adapted to receive and secure an article therein.

2. The wire pull attachment according to claim 1, further including a swivel assembly interconnecting the insert and basket such that the swivel assembly allows the basket to move freely relative to the insert.

3. The wire pull attachment according to claim 2, wherein a first end of the swivel assembly is connected to the second shank end.

4. The wire pull attachment according to claim 2, wherein the swivel assembly includes a clasp adapted to extend through an aperture in the second shank end to secure the swivel assembly to the second shank end.

5. The wire pull attachment according to claim 2, wherein the swivel assembly includes:
   (a) a clasp adapted to engage the insert; and
   (b) a rotating assembly connected between the clasp and the basket, the rotating assembly allowing the basket to rotate relative to the clasp.

6. The wire pull attachment according to claim 1, wherein the basket has a mesh-like structure adapted to stretch and cinch around the article.

7. The wire pull attachment according to claim 1, wherein the first shank end and second shank end have a hexagonal profile.

8. The wire pull attachment according to claim 1, wherein the second shank end has wedge-shaped profile and is adapted for use as a screwdriver.

9. The wire pull attachment according to claim 1, wherein the first shank end and second shank end have a cylindrical profile.

10. A wire pull assembly, comprising:
    (a) a quick-change assembly; and
    (b) a wire pull attachment, comprising:
        (i) an insert;
        (ii) a basket operably connected to the insert and adapted to receive and secure an article therein.

11. The wire pull assembly according to claim 10, wherein the quick-change assembly includes:
    (a) a quick release head;
    (b) a tailpiece for being received in a chuck of a drill; and
    (c) a rod interconnecting the quick-release head and tailpiece.

12. The wire pull assembly according to claim 11, wherein the insert is received and secured in a bore of the quick-release head.

13. The wire pull assembly according to claim 10, wherein the quick-change assembly includes a quick-release head for receiving and securing the insert therein, the quick release head comprising:
    (a) a body having a bore adapted to receive the insert; and
    (b) a sleeve positioned around the body adapted for movement axially along the body between a receiving position and a secured position.

14. The wire pull assembly according to claim 13, wherein when the sleeve is positioned in the receiving position, the bore is capable of receiving the insert.

15. The wire pull assembly according to claim 13, wherein when the sleeve is in the secured position, the insert is locked in the bore.

16. The wire pull assembly according to claim 11, wherein the rod is a flexible, solid core rod.

17. The wire pull assembly according to claim 10, further including a swivel assembly interconnecting the insert and basket such that the swivel assembly allows the basket to move freely relative to the insert.

18. The wire pull assembly according to claim 17, wherein the swivel assembly includes:
    (a) a clasp adapted to engage the insert; and
    (b) a rotating assembly connected between the clasp and the basket, the rotating assembly allowing the basket to rotate relative to the clasp.

19. The wire pull assembly according to claim 10, wherein the basket has a mesh-like structure adapted to stretch and cinch around the article.

20. A method of retrieving and pulling an article through a hole or channel, comprising the steps of:
    (a) providing a wire pull attachment having:
        (i) an insert; and
        (ii) a basket;
    (b) securing the wire pull attachment in a quick-release head;
    (c) inserting the wire pull attachment into the hole or channel;
    (d) positioning the article in the basket; and
    (e) pulling the wire pull attachment and article out of the hole or channel.

21. The method according to claim 20, further including the steps of:
    (a) drilling a hole or channel with a drill bit secured in the quick-release head; and
    (b) removing the drill bit from the quick-release head.

* * * * *